US008505058B2

(12) United States Patent
Dakss et al.

(10) Patent No.: US 8,505,058 B2
(45) Date of Patent: *Aug. 6, 2013

(54) SYNCHRONIZATION AND AUTOMATION IN AN ITV ENVIRONMENT

(75) Inventors: Jon Dakss, Marina del Rey, CA (US);
Paul Milazzo, Avondale, PA (US);
Karen Sarachik, Los Angeles, CA (US);
Allan Kotmel, Los Angeles, CA (US); V. Michael Bove, Jr., Wrentham, MA (US)

(73) Assignee: Ericsson Television Inc., Duluth, GA (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/180,756

(22) Filed: Jul. 12, 2011

(65) Prior Publication Data

US 2011/0271318 A1   Nov. 3, 2011

Related U.S. Application Data

(63) Continuation of application No. 11/051,405, filed on Feb. 4, 2005, now Pat. No. 8,010,986.

(60) Provisional application No. 60/542,119, filed on Feb. 4, 2004.

(51) Int. Cl.
*H04N 7/173* (2011.01)
*H04N 7/16* (2011.01)
*H04N 7/00* (2011.01)

(52) U.S. Cl.
USPC ............ 725/93; 725/135; 348/460; 348/461; 348/464

(58) Field of Classification Search
None
See application file for complete search history.

(56) References Cited

U.S. PATENT DOCUMENTS

| 6,415,438 | B1 * | 7/2002 | Blackketter et al. ........... 725/136 |
| 6,760,043 | B2 * | 7/2004 | Markel ......................... 715/717 |
| 6,799,326 | B2 * | 9/2004 | Boylan et al. .................... 725/35 |
| 6,983,391 | B2 * | 1/2006 | Woods et al. ................. 713/400 |
| 7,280,156 | B2 * | 10/2007 | Roelens ........................ 348/512 |
| 2004/0008973 | A1 * | 1/2004 | Marshall et al. ................ 386/85 |
| 2006/0031914 | A1 | 2/2006 | Dakss et al. |

FOREIGN PATENT DOCUMENTS

| EP | 1 432 250 A1 | 6/2004 |
| EP | 1 480 461 A2 | 11/2004 |

* cited by examiner

*Primary Examiner* — Chris Parry
*Assistant Examiner* — Omar S Parra

(57) ABSTRACT

A synchronization mechanism embeds synchronization triggers into a television signal or stream at regular intervals. The triggers include an accurate representation of the time in which the triggers were embedded. A receiving device decodes the triggers and synchronizes its internal timer based on the triggers. In this regard, the receiving device obtains a reference time from the internal timer and computes an offset between the reference time and the trigger time. The computed offset is then applied to the reference time. With the receipt of each new trigger, the application compares the trigger time to a new reference time with the most recently computed offset value applied. If there is any variance between these two values, the application creates a new smoothed offset.

20 Claims, 4 Drawing Sheets

SYNCHRONIZATION AND AUTOMATION IN AN ITV ENVIRONMENT

CROSS-REFERENCE TO RELATED APPLICATION(S)

This application claims the benefit of U.S. patent application Ser. No. 11/051,405, filed on Feb. 4, 2005, now U.S. Pat. No. 8,010,986 which claims the benefit of U.S. Provisional Application No. 60/542,119, filed on Feb. 4, 2004, the contents of which are incorporated herein by reference.

FIELD OF THE INVENTION

This invention relates generally to interactive television systems, and more particularly, to a system and method for synchronizing interactive television applications with audiovisual television content, such as a broadcast television program, commercial or video-on-demand (VOD) content.

BACKGROUND OF THE INVENTION

Interactive television (ITV) combines conventional television with additional content, referred to as ITV content, to present a viewer with an enhanced version of audiovisual television content, such as a broadcast television program, commercial or VOD content. As used herein, the term ITV content refers to any additional information or application that is invoked to create one of the aforementioned enhanced television experiences.

An ITV application may be a time-based application that contains ITV events that are tightly linked to an underlying audiovisual content element. Such time-based ITV events may invoke tightly synchronous interactive content such as, for example, play-along game content, karaoke, contextual quizzes, interactive advertisement content, and the like. Under current systems, however, the creating and maintaining tight synchronization of an ITV event with an underlying content element in a consistent and automated fashion remains a challenge. For example, any delay or interruption in the delivery of a television program segment causes the ITV event to be invoked before or after the relevant program segment. Furthermore, losses or alternations to the program data during its transmission process, or latencies in the receiving client during the display of the program, all negatively effect the synchronization of the ITV event to its underlying content element.

Accordingly, what is desired is a system and method which helps maintain synchronization of time-based ITV applications to their underlying audiovisual content elements.

SUMMARY OF THE INVENTION

The present invention is directed to a method for synchronizing an interactive television (ITV) event with a content element received by a receiving device. The method includes receiving a first trigger including a first time value for a first video frame of the content element. The method also includes obtaining a second time value recorded by an internal time source upon receipt of the first trigger. A first offset between the first time value and the second time value is computed, and the first offset is applied to the second time value. An ITV event is then retrieved based on the second time value with the applied first offset.

The present invention is also directed to a receiver synchronizing an interactive television (ITV) event with a received content element. The receiver includes a decoder, an internal time source, and a processor. The decoder decodes a plurality of triggers where each trigger includes a time value of a corresponding video frame of the program. The internal time source records time. The processor executes program instructions which obtain from the decoder a decoded first time value included in a first trigger and obtain from the internal time source a second time value recorded upon receipt of the first trigger. The program instructions further compute a first offset between the first time value and the second time value, and apply the first offset to the second time value. The program instructions then retrieve an ITV event based on the second time value with the applied first offset.

The triggers may be embedded into a video signal associated with the content element, or into a digital transport stream (e.g. an MPEG-2 Multi-Program Transport Stream). The internal time source may be an internal clock or a timestamp (e.g. a Presentation Time Stamp or PTS) value of a presented video frame.

According to one embodiment of the invention, additional triggers received by the receiver allow the calculation of more accurate offsets. In this regard, the receiver receives a second trigger including a third time value for a second video frame of the content element. The receiver also obtains a fourth time value recorded by the internal time source upon receipt of the second trigger, and computes a second offset between the third time value and the fourth time value. A third offset is derived based on the first offset and the second offset, and applied to the fourth time value. The third offset may be an average of the first and second offsets.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

In general terms, the present invention is directed to a synchronization mechanism invoked within an ITV system which helps to maintain tight synchronization between time-based ITV events and an underlying audiovisual content element, such as a segment of a television program, a commercial, a movie, VOD content, or other types of audiovisual content. The synchronization mechanism inserts synchronization triggers into a broadcast audiovisual signal or stream at regular intervals. The triggers may also be delivered over an out-of-band data path. The triggers are preserved throughout the entire transmission of the content element and provide a reliable time and/or frame delineation for the content element. The triggers are used by a reception device to regularly synchronize its time source. Once the time source is synchronized, an ITV application running on the reception device may use the synchronized time to retrieve and run time-based ITV events during the viewing of the content element.

Figure 1:
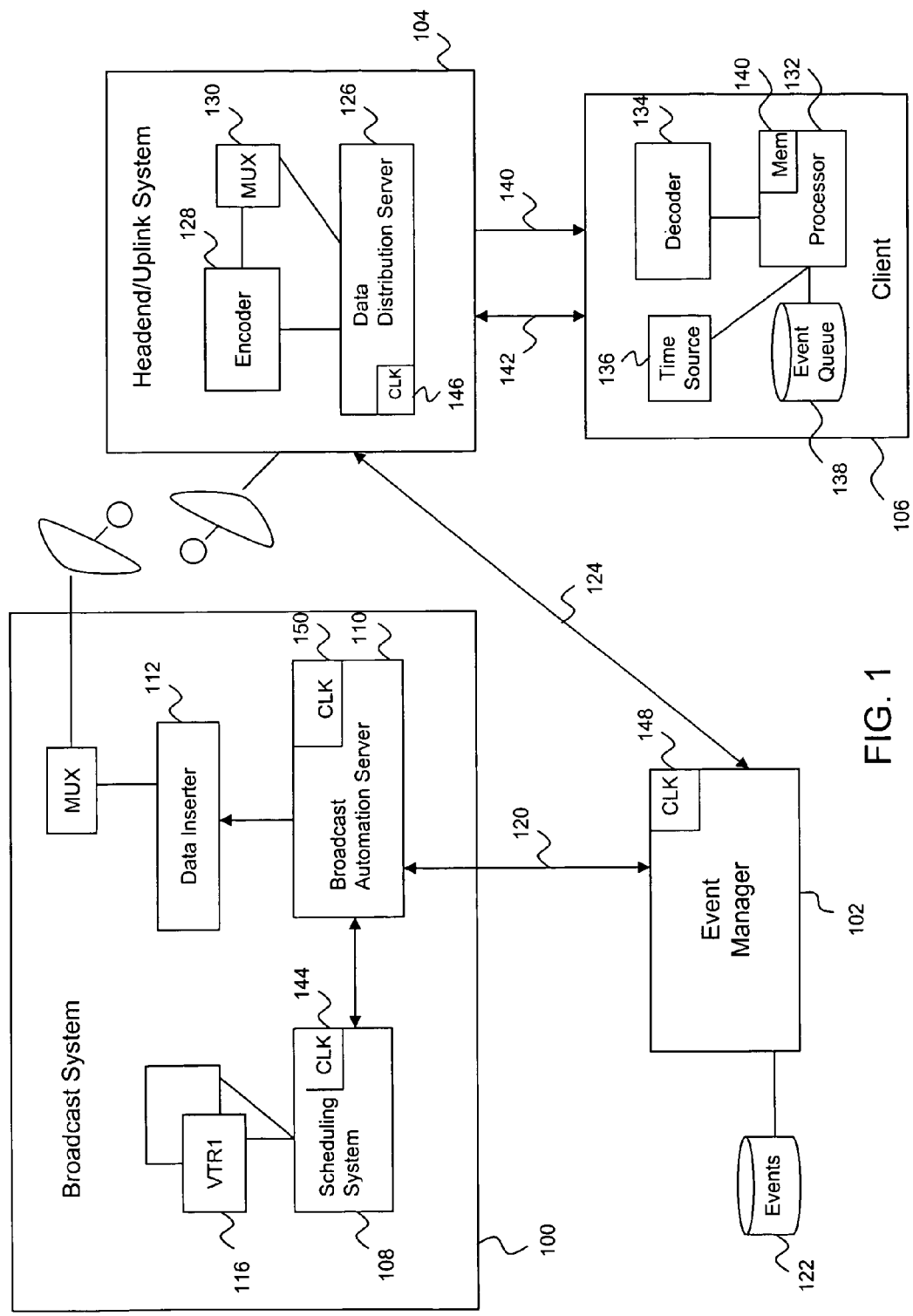
FIG. 1 is a block diagram of an ITV system according to one embodiment of the invention.

FIG. 1 is a block diagram of an ITV system according to one embodiment of the invention. The ITV system includes a broadcast system 100, event manager 102, headend system 104, and one or more clients 106. The broadcast system 100, which may be located at a broadcast operating center, includes a scheduling system 108, broadcast automation server 110, data inserter 112, and one or more video players 116 (e.g. VTRs). Other equipment typical in a broadcast operating center may also be included in the broadcast system 100, such as, for example, a character generator (not shown) for overlaying text and images on top of an audiovisual content element.

The scheduling system 108 generates a television programming playlist including a schedule of the programs to be transmitted on a given day. The playlist includes, for example, a list of timecodes along with their program segment identifiers, program segment sources, and/or program segment durations. The playlist is then used by the scheduling system 108 to drive the video players 116 containing the actual video and audio of the content elements that are to be delivered.

The broadcast automation server 110 monitors the generated playlist and detects any changes that may be made to the playlist. According to one embodiment of the invention, the broadcast automation server 110 reads ahead in the generated playlist by, for example, a couple of hours, and transmits up-to-date entries of the playlist to the event manager 102 over a wired or wireless data communications link 120. The data communications link 120 may be for example, a secure Internet link, local area network link, wide area network link, or the like.

The event manager 102 receives playlist information from different broadcast systems and retrieves appropriate ITV event information in response. According to one embodiment of the invention, the ITV event information for the different broadcast systems is centrally maintained in an ITV events database 122. In this regard, the ITV events database 122 stores for each broadcast station, a mapping of ITV events to specific segment (or show) identifiers. The ITV events database 122 further stores for each mapped ITV event, the ITV content presentation information and logic needed by a client for running the ITV event. Such information may include, for example, graphics, text, event times, duration information, and the like.

According to one embodiment of the invention, the ITV event manager 102 detects, among the received playlist information, a program segment that is associated with an ITV event, and prepares to playout data related to the ITV event. The playout data includes, for example, the actual logic and presentation information associated with the ITV event. In addition, the ITV event manager 102 transmits a command to the broadcast automation server 110 to start transmitting, at an appropriate time, synchronization triggers for inserting into the program.

The broadcast automation server 110 generates the synchronization triggers at regular intervals, such as, for example, every 5 seconds, and forwards them to the data inserter 112 for inserting into the content element. Each synchronization trigger includes at least an accurate representation of the time in which the trigger was inserted in the context of the underlying content element as measured by an internal clock 150.

According to one embodiment, the synchronization triggers are embedded into a content element via the data inserter 112. The data inserter 112 is an encoder configured to embed the synchronization triggers in a vertical or horizontal blanking interval of an analog video signal, in a private data field of an MPEG-2 transport stream, in an ancillary data space of a digital video stream, or the like. The triggers are embedded either dynamically or onto a source tape prior to broadcast.

The content element with the embedded synchronization triggers are transmitted to various recipients, including the headend system 104 of a local cable operator or some other uplink system. According to one embodiment of the invention, the headend system 104 includes a data distribution server 126 coupled to an encoder 128 and multiplexer 128, all of which are used to deliver the received content element and any associated ITV data to the client 106.

According to one embodiment, the headend (or uplink) system 104 includes a copy of all or a portion of the playlist generated by the scheduling system 108. The portion of the playlist may be communicated by the event manager 102 over a wired or wireless data communications link 124 such as, for example, a secure Internet link, local area network link, or wide area network link.

Based on its playlist and information provided by the event manager 102, such as, for example, information on the audiovisual content elements for which ITV event information is available, such as a program segment, the data distribution server 126 transmits to the event manager 102 one or more requests for associated ITV event information prior to the scheduled play time of the identified audiovisual content elements. The request is transmitted over the secure data communications link 124.

In response to the request from the data distribution server 126, the event manager 102 transmits to the headend system 104 all event presentation data and logic that the client will need to run an ITV event. The data distribution server 126 delivers to the client the received ITV event data at appropriate times which are calculated based on the scheduled ITV event times.

According to one embodiment of the invention, the ITV event information and logic is encoded into an MPEG-2 transport stream and streamed to the client 106 in-band with the content element. The ITV event information and logic may also be encoded into the vertical or horizontal blanking interval of an analog video signal or into an ancillary data space of a digital video stream. Furthermore, the ITV event information and logic may be delivered out-of-band over an Internet connection, or via a separate channel such as, for example, a return channel.

According to one embodiment of the invention, instead of transmitting the ITV event data to the headend system for delivering to the client, the event manager 102 transmits the data to the broadcast automation server 110 for embedding into the content element. In this scenario, the broadcast automation server 110 invokes the data inserter 112 for inserting the ITV event data into the content element. Thus, the content element received by the headend system 104 already includes the appropriate ITV event information needed by the client.

According to yet another embodiment of the invention, the event manager 102 transmits the command to generate and insert the synchronization triggers to the headend system 104 instead of the broadcast automation server 110. In this scenario, it is the data distribution server 126 at the headend which generates the triggers at regular intervals and embeds them into the content element via the encoder 128. Alternatively, the triggers may be transmitted out-of-band over an Internet link or via an out-of-band forward/return data channel.

Thus, according to the above embodiments, three scenarios are contemplated for transmitting synchronization triggers and ITV event information (collectively referred to as ITV data): (1) the broadcast system 100 embeds both the synchronization triggers and ITV event data into the content element, and the content element is transmitted to the headend system 104 for simply forwarding to the client 106; (2) the broadcast system 100 just embeds the synchronization triggers and it is the headend system 104 which transmits the ITV event data to the client 106; or (3) both the synchronization triggers and ITV event data are transmitted to the client by the headend system.

According to one embodiment of the invention, the client 106 is any ITV reception device known in the art, such as, for example, an analog or digital cable, terrestrial, or satellite set-top box. The client 106 includes a processor 132 coupled to a decoder 134 for retrieving and decoding any data embedded into a content element received over a transmission channel 140. The processor may further retrieve ITV data transmitted over an out-of-band data path 142. ITV event information needed for running a particular ITV event is stored in an event queue 138 and recalled upon a determination that it is time to run the stored ITV event.

The time for running an ITV event is determined via a time source 136 which, according to one embodiment of the invention, is kept synchronized to the various clocks 144, 146, 148, 150 used in the ITV system. The time source 136 may be an internal timer or clock, a timestamp value associated with a recently received, decoded, and presented video frame (e.g. the Presentation Time Stamp of an MPEG-2 video frame), or the like.

Figure 2:
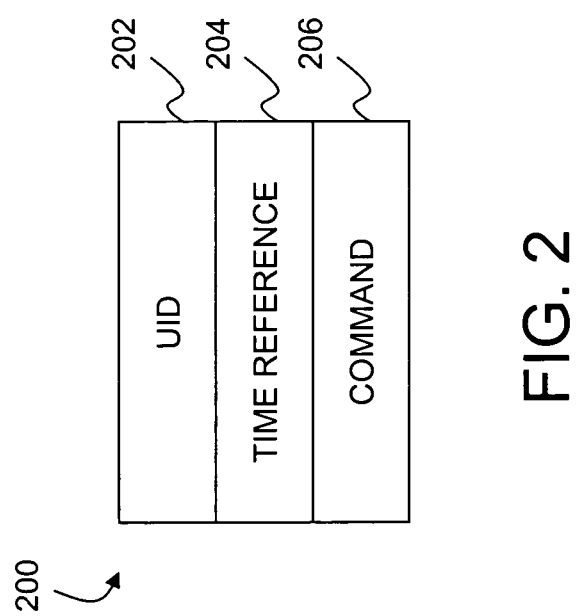
FIG. 2 is a block diagram of an exemplary synchronization trigger according to one embodiment of the invention.

FIG. 2 is a block diagram of an exemplary synchronization trigger 200 according to one embodiment of the invention. The trigger 200 includes a unique identifier (UID) 202, a time reference 204, and a command 206. The UID is an identifier to the underlying content element content, and may be decoded to retrieve a particular network, content element name, and episode (e.g. Game Show Network—"Greed"—Episode 221). Alternatively, the identifier may be a reference to a particular ITV event.

The time reference 204 provides an accurate representation of the time in the context of the underlying video source. According to one embodiment of the invention, the trigger contains a time reference to the actual frame of video transporting the trigger. The time reference may be an absolute time such as, for example, an SMPTE timecode in the form of hours:minutes:seconds:frames, or a Normalized Play Time (NPT) value in milliseconds, or a time offset from a reference point in the content element such as the start of a program segment, a nearest commercial break or the like.

The command 206 may be any command for decoding by the client processor 132. Exemplary commands include "start," "suspend," "resume," "end," and the like.

Figure 3:
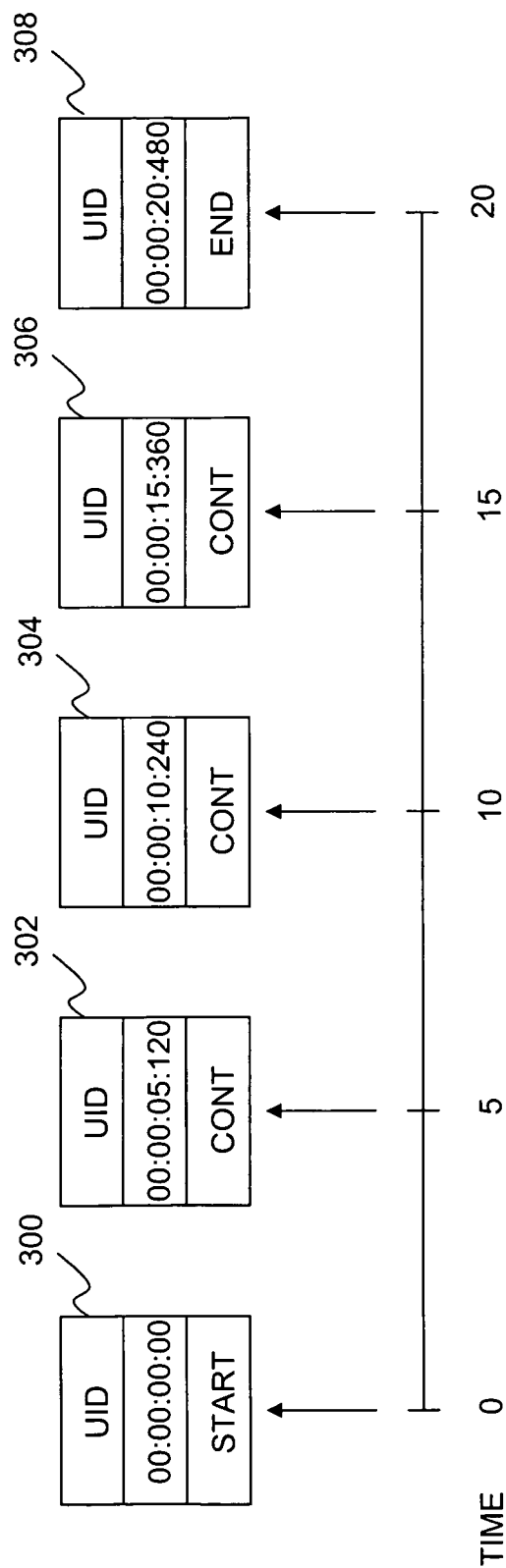
FIG. 3 is an exemplary synchronization trigger embedded into a video program segment according to one embodiment of the invention.

FIG. 3 is an exemplary synchronization trigger embedded into a content element according to one embodiment of the invention. A first trigger 300 is embedded for a frame of video which, according to the various clocks 144, 146, 148, 150 used in the system, is identified as frame "0" with time "0." The first trigger accurately represents this time and frame number, and further includes a "start" command. The "start" command may be interpreted by a receiving client as, for example, a command to start the client's time source 136 and the synchronization process. Five seconds into the content element, a second trigger 302 is embedded. The second trigger accurately represents a time of "5" seconds and frame number "120." The second trigger includes a "continue" command to indicate to the client, for example, that the synchronization process is to continue. Third, fourth, and fifth triggers 304, 306, 308 are similarly embedded at 10, 15, and 20 seconds into the program segment; thus, the third, fourth, and fifth triggers respectively indicate a time of "10," "15," and "20" seconds.

When the content element with the embedded triggers are processed and transmitted to the client 106, the time of receipt of the triggers may actually differ from the time in which they are expected to arrive. For example, assume that upon receipt of the first frame with the embedded first trigger 300, the client's time source is initialized to time 0. The client's time source thus begins synchronized with the actual content element time as measured by the various clocks 144, 146, 148, 150 utilized in the ITV system. However, assume that due to delays or interruptions in the transmission or processing of the content element, frame 120 of the content element is not received until 7 seconds later instead of the expected 5 seconds which is correctly indicated by the second trigger. The client may thus operate under the presumption that it is presenting a video frame that is 7 seconds into the content element instead of the actual 5 seconds. This may cause the client to mistakenly retrieve an ITV event to be run at 7 seconds into the content element.

In order to address this problem, a synchronization application is run by the client 106 at regular intervals to allow the client to lock itself to the time of the underlying content element as correctly indicated by the received triggers. In this manner, the client operates under the same clock as the clock 150 of the broadcast automation center or clock 146 of the data distribution server embedding the trigger, clock 148 of the event manager 102 providing the time-based ITV event information, and the clock of the scheduling system 144 generating the playlist.

The synchronization application is run by the processor 132 according to computer program instructions stored in its internal memory 140. According to one embodiment of the invention, a phase-locked-loop type approach which accuracy is improved with the receipt of each new synchronization trigger is employed for synchronizing the time source 136.

Figure 4:
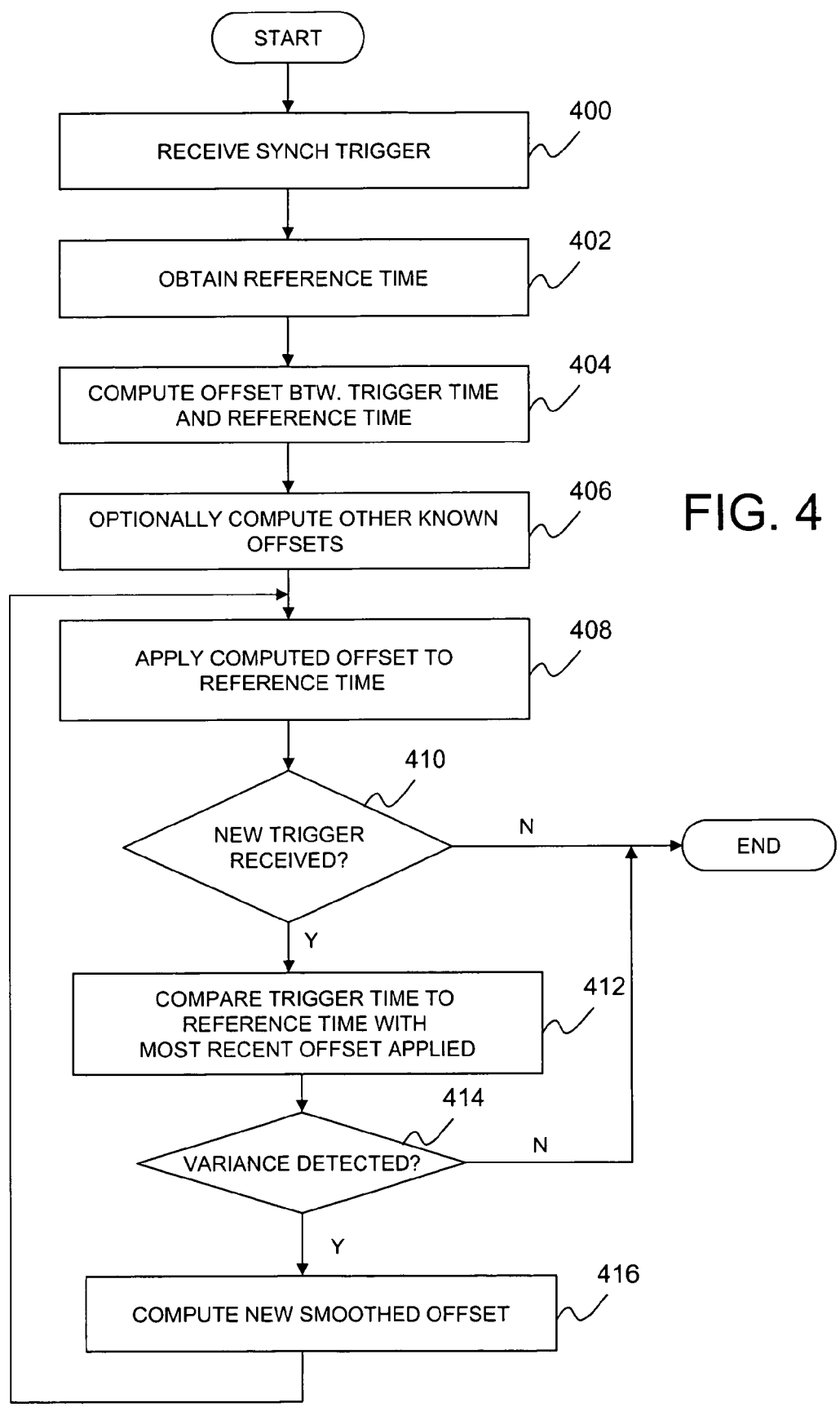
FIG. 4 is a flow diagram of a synchronization application process according to one embodiment of the invention.

FIG. 4 is a flow diagram of a synchronization application process according to one embodiment of the invention. In step 400, the application receives a synchronization trigger and in step 402 obtains a reference time that needs to be synchronized. The reference time may be a recorded time value of a running or initialized time source when the trigger is received, or a recorded video presentation value.

In step 404, the application computes an offset between the value of the time reference 204 in the received trigger (the "trigger time") and the reference time. An additional offset value may also be computed in step 406 based on a known fixed latency value. For example, if the trigger is transmitted through an out-of-band data channel, a known latency for transmitting such a trigger may be included into the computed offset value. The computed offset(s) is then applied to the reference time in step 408.

In step 410, a determination is made as to whether another synchronization trigger was received. If the answer is YES, the application compares, in step 412, the trigger time in the newly received trigger to a newly obtained reference time with the most recently computed offset value applied to it. If there is any variance between these two values, the application creates a new smoothed offset as is indicated in steps 414 and 416.

According to one embodiment of the invention, the smoothed offset is generated by applying a weighted average of the new offset value with previous offset values. According to another embodiment of the invention, smoothing and clock adjustment may be performed using a Network Time Protocol (NTP) algorithm.

According to one embodiment of the invention, if the variance detected in step 414 is larger that a predetermined threshold value, the variance is stored in a temporary memory location, and not used to compute a new smoothed offset. If a predetermined consecutive number of variances that exceed the threshold value are received, an average of the stored variances are used as the new offset, and any prior calculated offsets are discarded.

With the above mechanism, the offsets are calculated to be more accurate with the receipt of each new trigger, allowing tighter synchronization of time-based ITV events with the underlying video. The synchronization mechanism may be employed throughout the duration of an interactive event to prevent a lapse between the time context of the application and the time context of the related video content. According to one embodiment of the invention, if the synchronization application is expecting triggers but fails to receive them, the application may be suspended.

With a synchronized reference time, the client 106 may reliably retrieve appropriate time-based ITV events from the event queue 138. In this regard, the processor 132 computes a timecode based on the synchronized reference time and retrieves an ITV event in the event queue 138 corresponding to the computed timecode. Exemplary time-based ITV events include, but are not limited to, displaying a graphical overlay on top of the video, changing text on the screen, adding or subtracting graphical elements on the screen, generating a sound effect, triggering an animation, transmitting a data element through a return data channel, recording a value into memory, and the like.

A person of skill in the art should recognize that the synchronization approach in the above embodiments may be applied for analog and digital videos. In an analog environment, accurate timing can be achieved through the synchronization triggers and a clock within the synchronization application. In a digital environment, accurate timing can be achieved through the synchronization triggers and either a clock or video timestamp references within the target application.

The synchronization approach is aimed to remain consistent throughout a variety of broadcast and target hardware environments, including low-end set-top boxes with relatively low processing power. Furthermore, the approach is aimed to smooth the fluctuations in delay that can occur during the reception of data in the client 106, such as, for example, due to the execution of higher priority threads, memory management, and other operations performed by the client. The approach accommodates events common to a "real-world" broadcast environment, such as the possible elongation or shrinkage of a commercial break or program segment, interruptions in the feed or video content, and the like.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

The invention claimed is:

1. A method in a receiving device for synchronizing an interactive television (ITV) event with a content element, the method comprising:

receiving a content element;

receiving a plurality of synchronization triggers, wherein the content element is associated with a plurality of synchronization triggers, the plurality of synchronization triggers are inserted into a transport medium, and each synchronization trigger among the plurality of synchronization triggers further include a time indicia representing a time of a frame of the content element;

retrieving time indicia from each of the plurality of synchronization triggers;

synchronizing the receiving device based on the retrieved time indicia, wherein the synchronizing includes locking the receiving device to a time represented by the retrieved time indicia instead of a time indicated by a local time source; and wherein the receiving device is configured to synchronize the local time source by:

obtaining a first time value recorded by the local time source upon receipt of a first one of the plurality of synchronization triggers, computing a first offset between the first time value and the second time value corresponding to the time indicia in the first one of the plurality of synchronization triggers, applying the first offset to the first time value, obtaining a third time value recorded by the local time sources upon receipt of second one of the plurality of synchronization triggers, applying the first offset to the third time value, determining a fourth time value corresponding to the time indicia in the second one of the plurality of synchronization triggers, identifying a variance between the fourth time value and the third time value with the first offset applied, and computing a second offset based on the first offset and the identified variance, wherein the second offset is an average of the first offset and the identified variance.

2. The method of claim 1, further comprising:

adding a known fixed latency value associated with the transport medium to the first offset.

3. The method of claim 1, further comprising:

comparing the variance with a predetermined threshold;

ignoring the variance in computing the second offset if the variance fails to satisfy the predetermined threshold; and storing the variance in a temporary memory location, in response to ignoring the variance.

4. The method of claim 3, further comprising:

in response to determining a predetermined number of previous other variances fail to satisfy the predetermined threshold:

retrieving the variance from the temporary memory location, and computing the second offset with the retrieved variance.

5. The method of claim 1, wherein the transport medium is a digital transport stream.

6. The method of claim 1, wherein the transport medium is an out-of-band data path.

7. The method of claim 1, wherein the local time source provides a presentation value of a presented video frame.

8. A receiving device for synchronizing an interactive television (ITV) event with a content element, the receiving device comprising:
a memory;
a processor, coupled to the memory, the processor configured to:
receive a content element;
receive a plurality of synchronization triggers, wherein
the content element is associated with a plurality of synchronization triggers,
the plurality of synchronization triggers are inserted into a transport medium, and
each synchronization trigger among the plurality of synchronization triggers further include a time indicia representing a time of a frame of the content element;
retrieve time indicia from each of the plurality of synchronization triggers;
synchronize the receiving device based on the retrieved time indicia by locking the receiving device to a time represented by the retrieved time indicia instead of a time indicated by a local time source; and
wherein the processor, when synchronizing the receiving device, is further configured to:
obtain a first time value recorded by the local time source upon receipt of a first one of the plurality of synchronization triggers,
compute a first offset between the first time value and the second time value corresponding to the time indicia in the first one of the plurality of synchronization triggers,
apply the first offset to the first time value,
obtain a third time value recorded by the local time sources upon receipt of a second one of the plurality of synchronization triggers,
apply the first offset to the third time value,
determine a fourth time value corresponding to the time indicia in the second one of the plurality of synchronization triggers,
identify a variance between the fourth time value and the third time value with the first offset applied, and
compute a second offset based on the first offset and the identified variance, wherein the second offset is an average of the first offset and the identified variance.

9. The receiving device of claim 8, wherein the processor is further configured to:
add a known fixed latency value associated with the transport medium to the first offset.

10. The receiving device of claim 8, wherein the processor is further configured to:
compare the variance with a predetermined threshold:
ignore the variance in computing the second offset if the variance fails to satisfy the predetermined threshold; and
storing the variance in a temporary memory location in the memory when the variance is ignored.

11. The receiving device of claim 10, wherein the processor is further configured to:
when the predetermine number of previous other variances fail to satisfy the predetermined threshold:
retrieve the variance from the temporary memory location, and
compute the second offset with the retrieved variance.

12. The receiving device of claim 8, wherein the transport medium is a digital transport stream.

13. The receiving device of claim 8, wherein the transport medium is an out of-band data path.

14. The receiving device of claim 1, wherein the local time source provides a presentation value of a presented video frame.

15. A non-transitory computer-readable storage medium comprising computer-readable instructions, when executed by a processor, are configured to:
receive a content element;
receive a plurality of synchronization triggers, wherein
the content element is associated with a plurality of synchronization triggers,
the plurality of synchronization triggers are inserted into a transport medium, and
each synchronization trigger among the plurality of synchronization triggers further include a time indicia representing a time of a frame of the content element;
retrieve time indicia from each of the plurality of synchronization triggers;
synchronize the receiving device based on the retrieved time indicia by locking the receiving device to a time represented by the retrieved time indicia instead of a time indicated by a local time source; and
wherein the computer-readable instructions for synchronizing the receiving device, when executed by the processor, are further configured to:
obtain a first time value recorded by the local time source upon receipt of a first one of the plurality of synchronization triggers,
compute a first offset between the first time value and the second time value corresponding to the time indicia in the first one of the plurality of synchronization triggers,
apply the first offset to the first time value,
obtain a third time value recorded by the local time sources upon receipt of a second one of the plurality of synchronization triggers,
apply the first offset to the third time value,
determine a fourth time value corresponding to the time indicia in the second one of the plurality of synchronization triggers,
identify a variance between the fourth time value and the third time value with the first offset applied, and
compute a second offset based on the first offset and the identified variance, wherein the second offset is an average of the first offset and the identified variance.

16. The non-transitory computer-readable storage medium of claim 15, further comprising computer-readable instructions, when executed by the processor, are further configured to:
add a known fixed latency value associated with the transport medium to the first offset.

17. The non-transitory computer-readable storage medium of claim 15, further comprising computer-readable instructions, when executed by the processor, are configured to:
compare the variance with a predetermined threshold;
ignore the variance in computing the second offset if the variance fails to satisfy the predetermined threshold; and
storing the variance in a temporary memory location in the memory when the variance is ignored.

18. The non-transitory computer-readable storage medium of claim 17, further comprising computer-readable instructions, when executed by the processor, are further configured to:
when the predetermine number of previous other variances fail to satisfy the predetermined threshold:
retrieve the variance from the temporary memory location, and
compute the second offset with the retrieved variance.

19. The non-transitory computer-readable storage medium of claim 15, wherein the transport medium is a digital transport stream.

20. The non-transitory computer-readable storage medium of claim 15, wherein the transport medium is an out-of-band data path.

* * * * *